United States Patent [19]
Tucker et al.

[11] Patent Number: 5,943,761
[45] Date of Patent: Aug. 31, 1999

[54] METHOD FOR ADJUSTING THE GRAM LOAD OF HEAD GIMBAL ASSEMBLIES

[75] Inventors: Larry E. Tucker, Fremont; William P. Heist, Morgan Hill, both of Calif.

[73] Assignee: Read-Rite Corporation, Milpitas, Calif.

[21] Appl. No.: 09/135,516

[22] Filed: Mar. 2, 1998

Related U.S. Application Data

[62] Division of application No. 08/618,039, Mar. 18, 1996, Pat. No. 5,842,270.

[51] Int. Cl.$^6$ ........................................................ G11B 5/42
[52] U.S. Cl. ........................................ 29/603.03; 360/104
[58] Field of Search ................................ 29/603.03, 593; 360/103, 104

[56] References Cited

U.S. PATENT DOCUMENTS

| | | | |
|---|---|---|---|
| 5,459,921 | 10/1995 | Hudson et al. | 29/603.03 |
| 5,465,477 | 11/1995 | Tucker | 29/603.03 |
| 5,537,269 | 7/1996 | Zavouri | 360/104 X |

*Primary Examiner*—Carl E. Hall
*Attorney, Agent, or Firm*—Nathan N. Kallman

[57] ABSTRACT

The gram load of head gimbal assemblies (HGA) of a head stack assembly (HSA) is adjusted before the HSA is installed in a disk drive. Each HGA includes an elongated flexible member having a bend that is transverse to the longitudinal axis of the HGA. The apparatus includes means for removably mounting the HSA for movement in a plane parallel to the longitudinal axis of the selected HGA to a Gram Load Adjusting (GLA) station, means to restrain movement of the HGA during gram load adjustment, a force-transmitting bar having an elongated bearing edge, means for positioning the bar with the edge parallel to the bend and in force-transmitting contact with the bend area of the flexible element, and means for moving the edge to adjust the gram load to a desired value.

9 Claims, 5 Drawing Sheets

METHOD FOR ADJUSTING THE GRAM LOAD OF HEAD GIMBAL ASSEMBLIES

This application is a divisional application of Ser. No. 08/618,039 filed Mar. 18, 1996, now U.S. Pat. No. 5,842,270.

FIELD OF THE INVENTION

This invention relates to the manufacture of Head Stack Assemblies (HSAs) used in rotating magnetic disk drives and in particular to a method and apparatus for selectively adjusting the gram load of each Head Gimbal Assembly (HGA) of an HSA to a predetermined value during the manufacturing process and prior to the time that the HSA is installed in the head positioning system of a disk drive.

DESCRIPTION OF THE PRIOR ART

Typically, a disk drive comprises one or more magnetic disks having magnetic surfaces for storing data. The disks are mounted on a spindle and continually rotated at a substantially constant speed. A plurality of head arm assemblies are arranged together in a stacked assembly resembling a comb-type structure. The Head Stack Assembly (HSA) is attached to an electromagnetic actuator which is controlled by a head positioning system. The actuator positions the magnetic heads or transducers to preselected concentric recording tracks under the control of an address signal supplied to the actuator from the data processing system.

Each head is spaced from the associated disk surface by a film of air created by the disk as it is rotated. This type head is referred to in the art as an air bearing type head. The HGA includes the relatively rigid section including the nut plate and the flexible Head Gimbal Assembly (HGA) section which is rigidly attached by a swaging operation to the nut plate. The HGA includes the magnetic transducer or head which is mounted to an air bearing slider that is attached to a flexible sheet metal member or flexure by means of a gimbal type mounting. The head is biased toward the magnetic surface of the rotating disk by a predetermined bend in the flexible element located adjacent to the nut plate of the HGA.

The transducer is supplied with data signals during the recording mode of the disk drive. During reading of the recorded data, the transducer senses the magnetic transitions recorded on the disk representing the data. The individually manufactured head arm assemblies that are associated with each disk surface are assembled into a comb-type structure with the transducers at the distal ends of the HGAs accurately aligned vertically. In a similar fashion, the other ends of the arm assemblies must be attached to the actuator so that each arm moves over a corresponding path.

The personal computer and in particular the so called "lap top" models of personal computers, have imposed a size parameter on disk files which is in total opposition to the currently desired capacity requirements for data storage. As the need for more storage capacity increases, there is a need to reduce the size of disk drives. Disk diameter is a dominating factor in determining the footprint of the drive. The number of disks in the stack generally determines the height of the drive. In the last few years disk diameters for fixed disk drives used in personal computers have decreased from 5½ inches to 3¾ inches to 1 1/8 inches. Presently, prototype disk drives employing 1 inch disks are in development. The decrease in size has had little or no impact on storage capacity, in that the various technologies which directly affect capacity, such as linear recording density and track density, have been substantially improved. Also, configurations now can employ more disks in a given height since a decrease in the spacing between disks has been made possible. A major effect of the decrease in size has been the inability to employ past assembly practices in the construction of these smaller disk files. For example, as the various components of the HSA become smaller, the force which is applied to each magnetic head by the flexible element to bias it towards the disk surface becomes smaller and the tolerances permitted for this force become very narrow. It is then necessary to adjust every HGA after assembly into the HSA, not just those whose initial gram loads were disturbed during assembly into the HSA.

In addition, the individual components on the HGA become more fragile and are easily damaged if extreme care is not exercised during each of the assembly operations. A head arm assembly operation generally comprises joining together a relatively stiff element and a relatively flexible element by a swaging operation. A head gimbal assembly (HGA) comprising a magnetic transducer and a gimbal type mount is attached to the distal end of the flexible element, usually by spot welding. The other end of the flexible element has a nut plate welded to the element. The nut plate includes a cylindrical boss which extends normal to the flat surface of the plate and is designed to mate with an opening disposed in the end section of the rigid element. The elements are aligned precisely and spot welded to maintain their alignment during the subsequent swaging operation. The swaging operation involves a series of steps in which a cylindrical ball slightly larger than the opening in a boss is forced through the boss thereby cold forming the boss material to the area of the rigid element surrounding the boss. Three separate operations are performed, each with a ball having a larger diameter. This swaging operation has become the most critical step in the manufacturing process as the size of the components has decreased and their fragility has increased. The biasing force for the magnetic transducer is provided in the flexible element by bending the flexible element along a line perpendicular to the lengthwise axis of the arm and subsequently returning the element to its original position while simultaneously stress relieving the bend area by heating it with a laser until the desired gram load force is obtained. The required gram load is determined by the flying characteristics of the transducer relative to the magnetic surface.

Assembly operations of the HSA involve providing a guide means, such as a guide hole, in the actuator end of the head arm. Each HGA is sequentially placed on a shaft with suitable ring type spacers between each arm. Each arm is affixed to the shaft by ball swaging or adhesive.

The measurement of the gram load on each head of the HSA is currently achieved by an operator and a measurement apparatus. The apparatus includes a horizontal platform that is movable in a straight line by the operator in a horizontal plane between a home position and a measurement test position. The platform includes a mounting post normal to the platform which is similar to the pivot bearing of the actuator. The operator mounts the head stack on the mounting post and rotates it to a referenced angular position where it is clamped.

The HSA is provided with a shipping comb which functions to maintain the adjacent head arms spaced apart a predetermined distance while the HSA is being tested before installation in the disk drive. The shipping comb is arranged to pivot out of position during the gram load measuring operation to permit each head to apply a force to a sensing device that measures and displays the value of the gram load of that head to the operator.

After positioning the HSA on the platform, the operator moves the platform to the measurement position. As the heads reach the measurement position, the shipping comb is pivoted out of position, allowing each HGA arm of one pair to engage opposite sides of a rotatable cam separator pin. By rotating the pin 90 degrees, one head of the pair is allowed to engage its respective sensing device depending on the direction of rotation. The heads are measured one at a time. For example, where the HSA includes four heads, four separate sensing devices are provided so that the operator is advised if any head is out of specification.

With the decrease in size, the head arms become less sturdy and hence are more sensitive to the swaging operation with the result that the alignment of the heads may be adversely affected. Further, if one HGA arm proves, on testing of the head stack, to be out of specification for the gram load, the possibility of manually adjusting the flexible element to obtain the correct biasing force is almost impossible.

The rework operation to replace the HGA having the incorrect gram load with a new head, or to at least salvage the good head arms, (usually 3 arms) was very complicated due to the swaging construction and the more fragile nature of the smaller components. The present invention provides a method and apparatus which permits the selective adjustment of the gram load biasing force for each HGA in an HSA at a time in the manufacturing operation that the gram load for the HGAs of the HSA are being measured, thereby eliminating the need to rework a high percentage of HSAs where one head does not meet the specification for the correct gram load biasing force.

SUMMARY OF THE INVENTION.

In accordance with the present invention, a method and apparatus to permit adjusting the gram load biasing force selectively for each HGA of a Head Stack Assembly (HSA) which does not meet the established gram load specification involves the following functional inter-relationships, embodied either as steps of a method or a combination of functionally inter-related hardware components, the preferred embodiment of which is shown in the drawing and described in the specification.

Since the measurement of the gram load on each HGA of the HSA is currently achieved by an operator and a measurement apparatus, that apparatus has been modified to incorporate the necessary inter-related hardware that is the subject of the present invention. The movable platform on which the HSA is mounted is employed in the preferred embodiment to position the HSA in an operable position relative to the Gram Load Adjustment (GLA) station. The GLA station includes a vertical support tower which is provided with a plurality of horizontally extending arm supports, each having a generally rectangular cross-section. The supports are vertically aligned and spaced apart a distance to permit each of the head arms to slide into one of the slots defined by adjacent supports as the support tower is moved sideways towards the HSA. The supports extend a distance from the vertical support tower structure sufficient to encompass the entire width of the head arm. The function of the support tower and horizontal supports is to retain each HGA in a substantially rigid position in the event that a plus or minus adjustment is to be made to the gram load of the HGA flexible element to bring it into the range set forth in the HSA specification.

The GLA station further includes a mechanism for applying an adjusting force uniformly across the flexible element of the HGA at the point where it joins the nut plate, in order to adjust the initial gram load of the HGA to the correct load. The mechanism includes a pair of towers which are movable vertically and which support a pair of horizontally disposed rigid pins. The vertical movement of the towers, up or down, moves both pins, one of which contacts the flexible element. Subsequent movement adjusts the gram load by either increasing or decreasing the gram load initially built into the bend of the flexible element to bring it within acceptable limits.

The mechanism is arranged to permit the horizontally disposed rigid pins to be selectively positioned vertically relative to the head stack in order to select the HGA requiring the gram load adjustment. In this regard, the rigid pins are attached to one tower in a cantilevered fashion and spaced apart vertically to permit the pins to straddle the flexible element of the selected head arm. The other tower is provided with a pair of recesses that are adapted to receive the distal ends of the rigid pins as the first tower is moved horizontally and the pins straddle the flexible element.

The towers are movable vertically by a manually operated micrometer so that the space between the pins can be positioned in the plane of the flexible member of any one of the HGAs. The adjustment in gram force is made by the operator dialing a distance on the micrometer that corresponds to a the adjustment value. The micrometer moves the towers so that the rigid pins move in a vertical plane applying an equal force across the entire width of the flexible member. This prevents the flexible member from twisting about its lengthwise axis which would adversely affect the flying characteristics of the head.

Means are also provided to maintain the distal end of the arm containing the magnetic head in substantially the same horizontal plane, when the adjusting force is applied to the flexible element.

It has been found that a linear relationship exists between the required force adjustment and vertical movement of the pins as measured by the micrometer mechanism. For example, if the gram force of the head as originally measured is 0.01 gram less than the desired optimum force, the operator needs only to move the pins 0.001 millimeter. If however the measurement is 0.02 grams less than desired, the operator would move the pins vertically 0.002 millimeter.

The direction of vertical movement depends on whether the HGA is facing up or facing down, which in turn depends on the location of the head arm in the head stack. If the HGA is facing down and the gram load needs to be increased, the vertical movement is downward. If the gram load needs to be decreased the vertical movement is upward. If the HGA is facing upward, the above vertical direction for increasing the load would be upward and downward for decreasing the gram load.

An object of the present invention to provide an improved apparatus for adjusting the gram load of an HGA in a head stack assembly.

Another object of the present invention is to provide an improved method of selectively adjusting the gram load of a selected HGA in a Head Stack Assembly having a plurality of HGAs.

Another object is to provide an apparatus for adjusting the gram load of an HGA to within a predetermined range in connection with the HSA manufacturing step which measures the gram load of each HGA at the HSA level of assembly.

A further object of the present invention is to provide a method and apparatus which allows an operator to manually measure and adjust the gram load of each HGA of a HSA selectively in accordance with predetermined specifications.

BRIEF DESCRIPTION OF THE DRAWING

The invention will be described in greater detail with reference to the drawing in which.

DESCRIPTION OF THE PREFERRED EMBODIMENT

Figure 1:
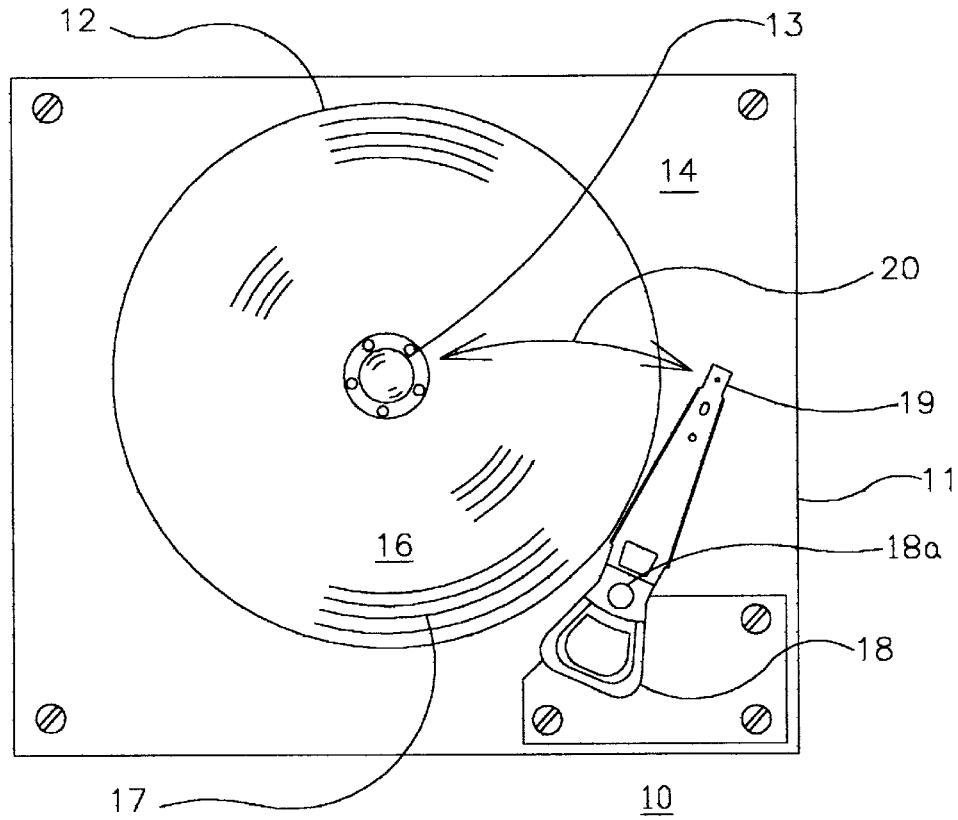
FIG. 1 is a schematic plan view of a typical disk drive.

FIG. 1 is a schematic plan view of a disk drive 10 which includes a base plate 11 on which is mounted a plurality of magnetic disks 12 that rotate about an axis 13 that is normal to the surface 14 of the base plate 11. The disks 12 are rotated by means of a motor (not shown) at a constant speed during the transfer of data to and from the disks 12 that are positioned under the base plate 11. The disk surface 16 has a relatively large number of closely spaced concentric recording tracks 17. The drive 10 includes a rotary type actuator 18 for positioning magnetic heads 19 relative to the recording tracks 17 on the recording surfaces of disks 12. The magnetic heads 19 are rotated on pivot bearing 18a and moved in an arc 20 across the surface of disk 12 during a track accessing operation.

Figure 2:
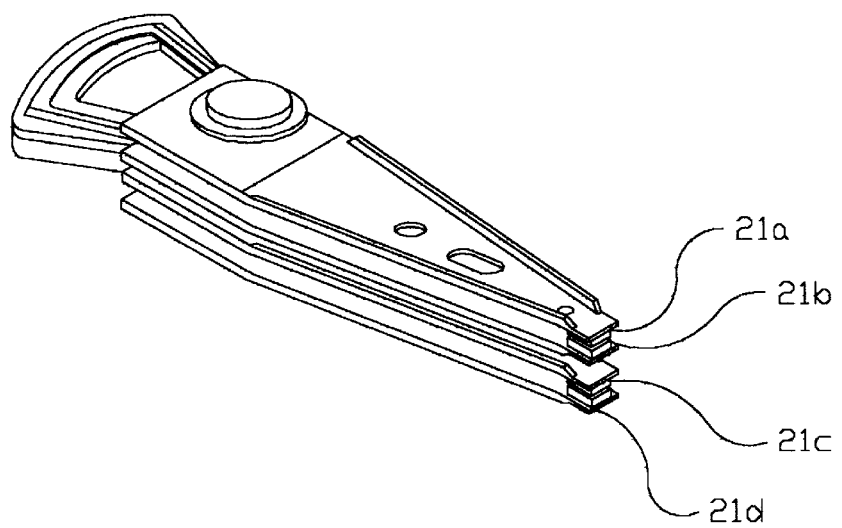
FIG. 2 is an perspective view of a head stack assembly.

FIG. 2 is an perspective view of the head stack assembly at the manufacturing level immediately prior to the step of measuring the gram load. As shown the HSA comprises an assembly of four HGAs designated 21a thru 21d. Assemblies 21a and 21b have gram loads that bias the magnetic heads towards each other. In operation the magnetic heads for HGAs 21a and 21b are biased toward and fly over opposite surfaces of the top magnetic disk of a two disk stack. Heads for HGAs 21c and 21d are similarly arranged relative to the bottom disk of the two disk stack.

Figure 3:
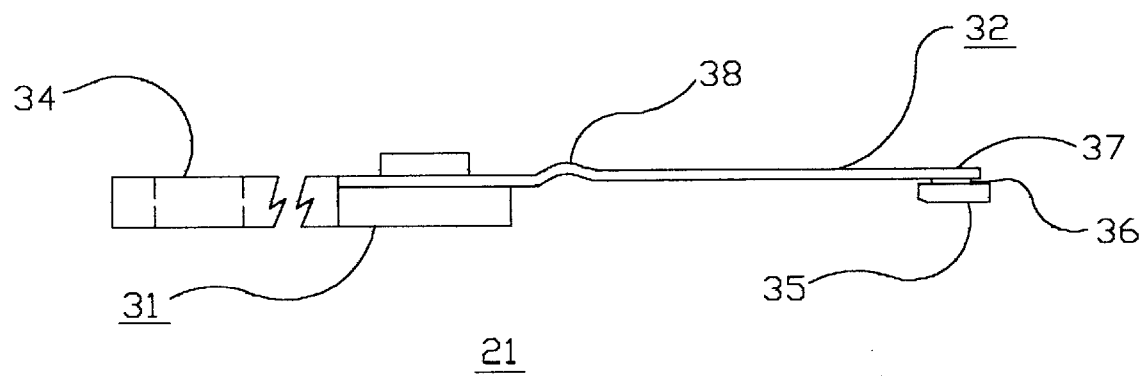
FIG. 3 is a side view of a head arm assembly.

FIG. 3 is a side view of a single HGA 21. In general the functional elements of the HGA 21 as shown in FIG. 3 comprises a relatively rigid section 31 and a relatively flexible section 32, which are swaged together. The end of section 31 is provided with a circular opening which is adapted to receive the pivot bearing 18a that is part of the electromagnetic actuator 18 which positions the heads in the disk drive 10, as shown in FIG. 1.

An HGA comprising an air bearing slider 35 that supports a magnetic transducer, and a gimbal type mounting 36, is attached to the end 37 of the HGA 21. The bend 38 in the HGA 21, as shown, is in the area where the rigid section 31 ends and is obtained by bending the flexible element 32 to provide a predetermined gram load when the head is bent back to its initial horizontal position and when the HSA is positioned in the disk file 10. After the heads are assembled in the head stack assembly, a removable shipping comb (see FIG. 2) is provided for the HSA that keeps the heads separated during the subsequent manufacturing and testing operations. The comb is removed when the HSA is installed in the disk drive.

Figure 4:
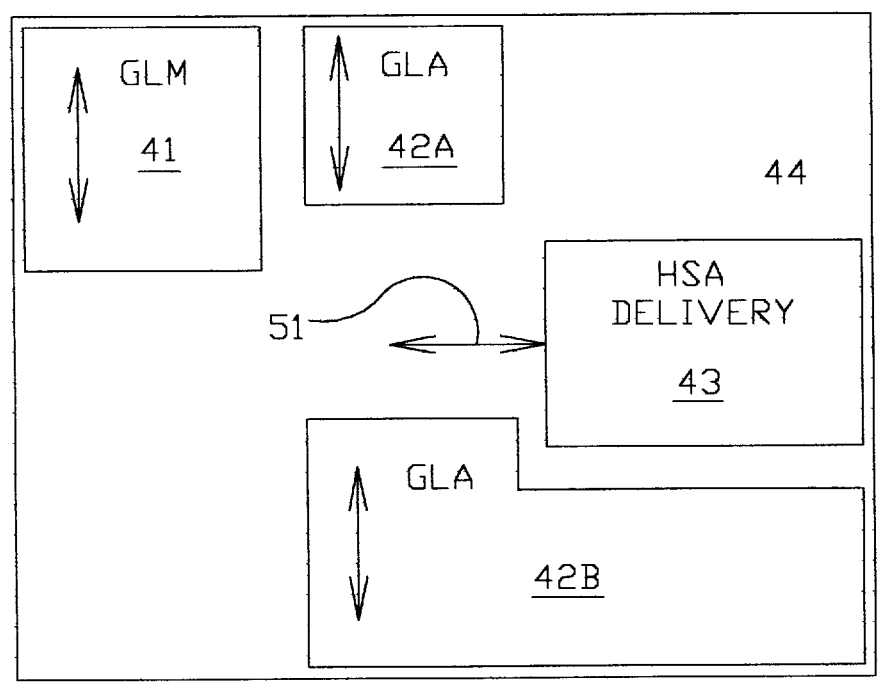
FIG. 4 is a diagrammatic plan view of the apparatus embodying the preferred embodiment of the present invention which illustrates the spatial relationships of the various major functions of the components of the novel apparatus of this invention.

FIG. 4 is a diagrammatic plan view of the apparatus embodying the preferred embodiment of the present invention which illustrates the spatial relationships of the various major functional components of the apparatus. The apparatus comprises a Gram Load Measuring station (GLM) 41, a two section Gram Load Adjusting (GLA) station 42A and 42B, and an HSA delivery platform 43 that is movable manually by the operator from a home position 44 to either an operable position in the GLM station 41 or the GLA station 42.

Figure 5:
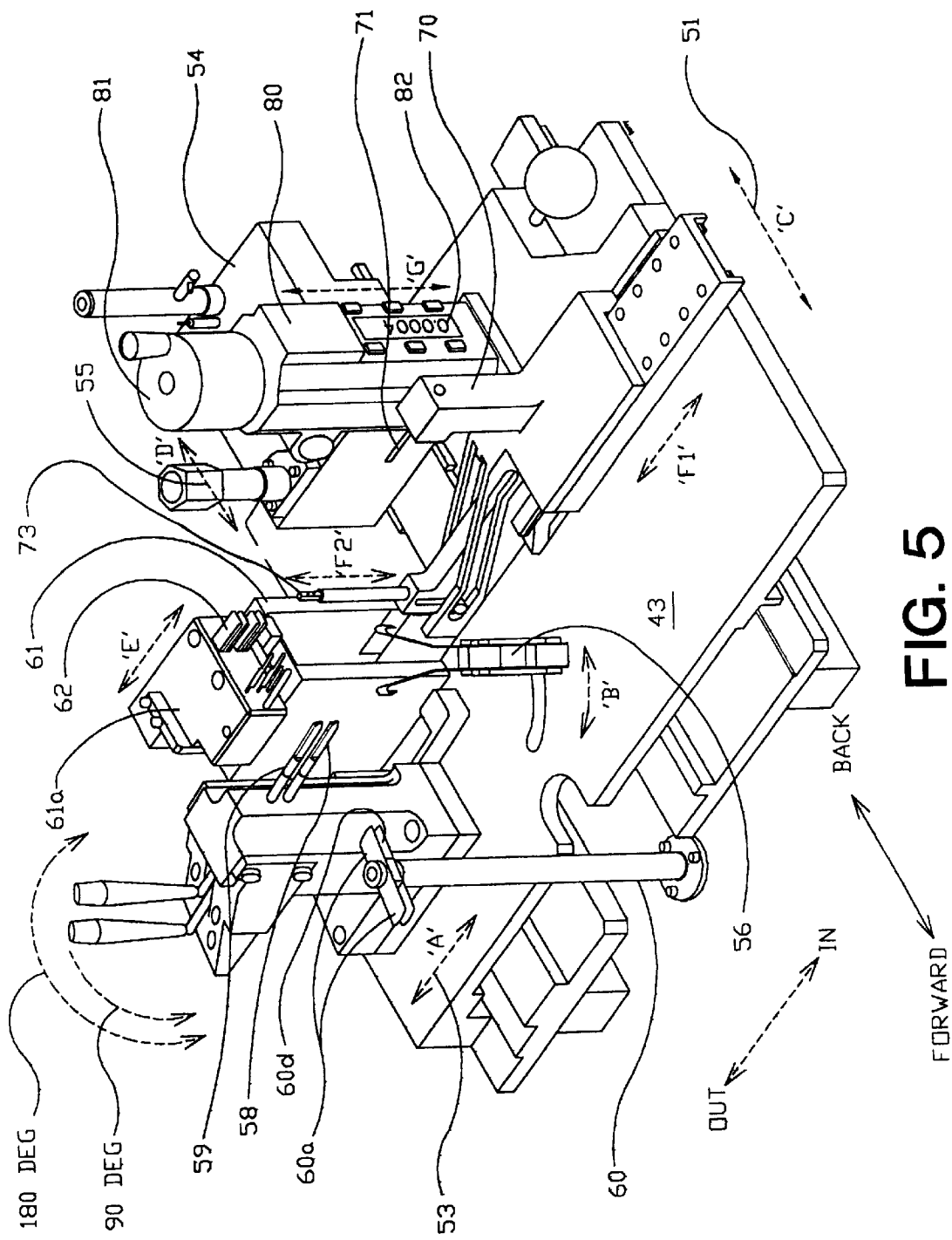
FIG. 5 is a perspective view of the apparatus shown in FIG. 4 for measuring and adjusting the gram load.

The GLM station 41 is described with reference to FIG. 5 which illustrates how the GLM and GLA stations have been combined. Any prior art gram load measuring apparatus may be employed in connection with the present invention to provide indications of the actual gram load on each HGA in the stack. With reference to FIG. 5, the function of delivering the HSA to the measuring station is achieved by the delivery platform 43 which is movable back and forth as indicated by bidirectional arrow 51 from a home position as shown in FIG. 5. The HSA clamping platform 54 is movable relative to platform 43 in a direction parallel to arrow 51, as indicated by bidirectional arrow 55. The HSA is moved to the measuring station by the combined movements of platforms 43 and 54 being moved to the left by the operator as seen in FIG. 5.

A comb remover device 56 functions to automatically remove a shipping comb 39, shown in FIG. 2, from the HSA when the HSA is moved toward the measuring station. A tower 60, which is movable bidirectionally in the directions of arrow 53, contains a pair of pins 58 and 59 that slide between adjacent HGAs 21 which are biased toward each other. The pins 58 and 59 are inserted between the head arms as the tower 57 is moved toward the HSA and before the shipping comb is automatically removed by device 56.

The gram load on each HGA is measured separately by rotating one of the pins 58 or 59 either clockwise or counterclockwise. Each pin 58 and 59 has a semi-circular cross-section which allows the pin to function as a separator cam when the circular portion of the pin engages the HGA. However when the cam is rotated 90 degrees, the separator function is removed for one HGA so that the HGA is allowed to move toward the axis of the pin under the gram load built into the HGA. The magnetic head at the end of the arm 21 that is allowed to move and engage one of four surfaces 60a–60d provided on the tower 60. The gram load is then recorded and displayed to the operator. If the gram load is not within specified limits, the HSA is moved to the GLA station by the operator moving the platform 43 to the right, as shown in FIG. 5. The gram load may be adjusted by the operator to meet the desired value at the GLA stations 42A and 42B.

The functional aspects of the Gram Load Adjust stations are described in connection with FIGS. 6A –6C and the corresponding structural components shown in FIG. 5. The GLA 42A and 42B comprises a stationary tower designated with reference character 61 in FIG. 5, which is mounted on and movable with the main delivery platform 43. Tower 61 includes a block 61a that is provided with three groups of cantilevered projecting elements which function to maintain each of the head arm assemblies in a relatively fixed position during the adjusting operation at the GLA station.

Figure 6A:
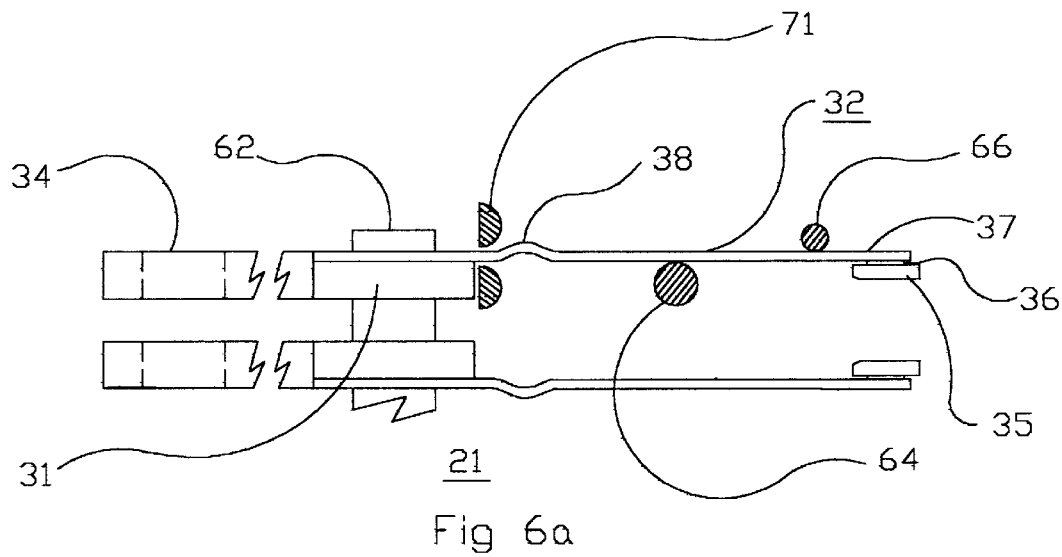
FIG. 6a is a schematic side view of the HGA shown in FIG. 3, illustrating how the HGA is held during an adjusting operation.

The first group of cantilevered elements as shown in FIG. 6a comprise four elements 62 which have rectangular cross-sections and are aligned vertically in a comb-type configuration. One element 62 is associated with each actuator arm 21 and is positioned, as shown in FIG. 6a, such that the rigid section 31 of the arm is maintained in a horizontal plane when the shipping comb is removed and replaced with separators.

The second set of elements comprises a pair of separator pins 64 (see FIG.6A), which are associated with pairs of opposing HGAs 21. Pins 64 function as separator pins by limiting the movement of the head in a direction caused by the initial gram loading force. The separator pins 64 are aligned vertically and have a diameter dictated by the arm spacing of the HSA. These pins function to prevent the heads of adjacent head arms that are biased toward each other from coming in contact when the shipping comb is removed.

The third set of elements includes a pin 66 associated with the HGA 21, located on the opposite side of the HGA 21 from the separator pin 64 and offset toward the distal end of the HGA as shown in FIG. 6a. The function of the pin 66 is to restrain any vertical movement of the head end of the HGA that may result from an adjusting force being applied to the HGA.

The adjusting station also includes a means for applying a bending force to the flexible section of the head arm. FIGS. 6b is and 6c illustrate schematically the function of adjusting the gram load by applying a uniform force across the width of the flexible section at the point where it joins the relatively rigid section of the HGA. As shown in FIG. 6b, a tower post 70 is provided with a pair of vertically aligned horizontally disposed cantilevered elements or pins 71. The post 70 is movable in a direction indicated by arrow 72 parallel to the axes of cantilevered elements 71. The post 70 is moved horizontally in that direction so that elements 71 straddle the flexible element 32 of HGA 21 adjacent to the nut plate area 76.

Figure 6B:
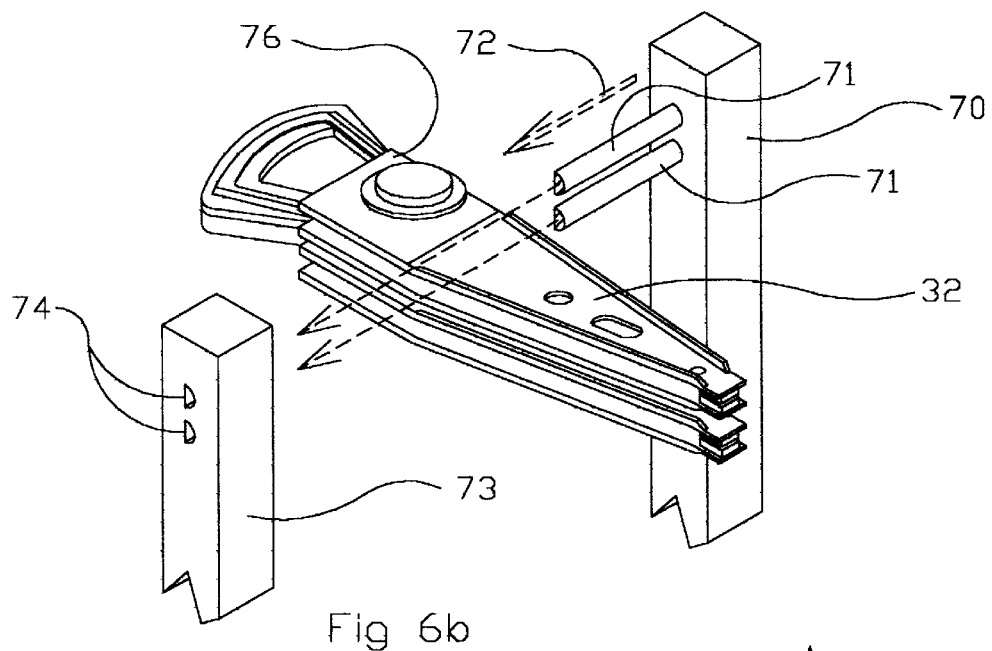
FIGS. 6b and 6c are schematic perspective views illustrating the function of the towers and rigid pins which apply the force to the HGA to adjust the gram load.
Figure 6C:
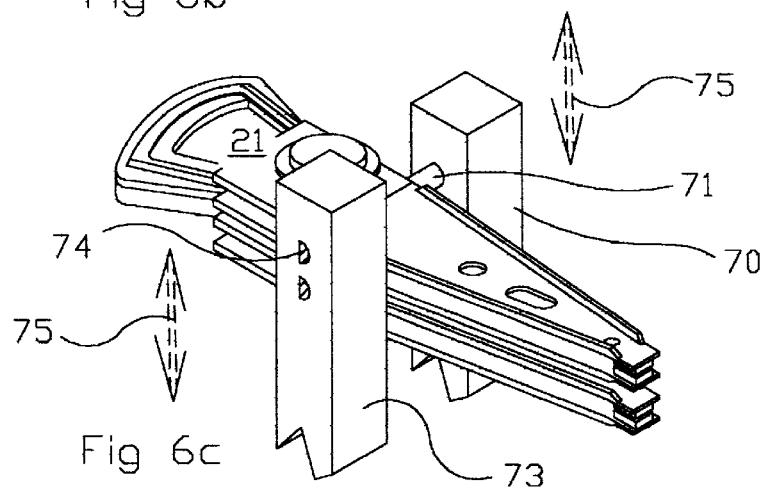

A second post 73 is provided with a pair of recesses 74 for receiving the distal ends of cantilevered elements 71 as shown in FIG. 6c. The posts 70 and 73 are movable conjointly vertically as indicated by bidirectional arrow 75 in FIG. 6c. This movement which is controlled by the operator permits the operator to position the pins 71 vertically so that they are able to straddle a selected HGA. Subsequently, the operator moves the pins 71 a predetermined distance to apply the appropriate force to correct the gram load. The pins 71 act as a force-transmitting bar.

With reference to FIG. 5, the tower 61 comprises an inverted U-shaped member which is mounted on and moves with main delivery platform 43. The support block 61a, which supports the three groups of cantilevered elements 62, is slidably mounted on the inverted base of the U-shaped member 61. The HSA is positioned in the adjust station 42A, 42B by the operator and the support block 61a is moved in a direction towards the HSA until the respective cantilevered members are in position to perform the functions described earlier. The operator then removes the shipping comb.

The mechanism to apply the adjusting force described functionally above and shown in FIGS. 6b and 6c comprises the horizontally movable tower 70 and the tower 73 which is movable in a vertical direction conjointly with tower 70. Tower 70 carries the pins 71 which straddle a selected HGA and engage in the recesses 74 in the tower 73 as tower 70 is slid into position.

The means for positioning the pins 71 vertically relative to the HGAs of the HSA comprises a micrometer 80, mounted to move the towers 70 and 73 conjointly in a vertical direction independently of the horizontal movement and position of tower 70. The micrometer 80 is provided with a knob 81 and a distance scale 82. The operator rotates knob 81 in a direction to move the towers 70 and 73 vertically while easing the movable tower horizontally at towards the selected HGA needing adjustment. When correctly positioned vertically, tower 70 is slid into position with the pins 71 straddling the flexible section of the HGA and their distal ends engaged in the recesses 74 of tower 73.

The force required to adjust the gram load of the selected head to within the required tolerances is obtained from a reference table that converts a required gram load adjustment to a vertical distance to move the towers 70 and 73. The operator moves the towers 70 and 73 vertically up or down the distance obtained from the table, as indicated on the millimeter micrometer scale 82, by rotating knob 81. The movement causes the gram load to change accordingly in a substantially linear fashion over a wide range of gram load values.

In situations where the tolerance limits are quite small, such as hundredths of milligrams, it may be necessary to provide the operator with a more precise indication of when the pin 71 actually contacts the HGA, since some vertical tolerance must be provided in order for the pins to straddle the head arm. The actual point of contact can be provided by any prior art sensing device which functions to provide an indication that two members are in contact. The sensing device would allow the operator to accurately measure the distance that the micrometer must move and hence obtain more consistent corrections.

Figure 7:
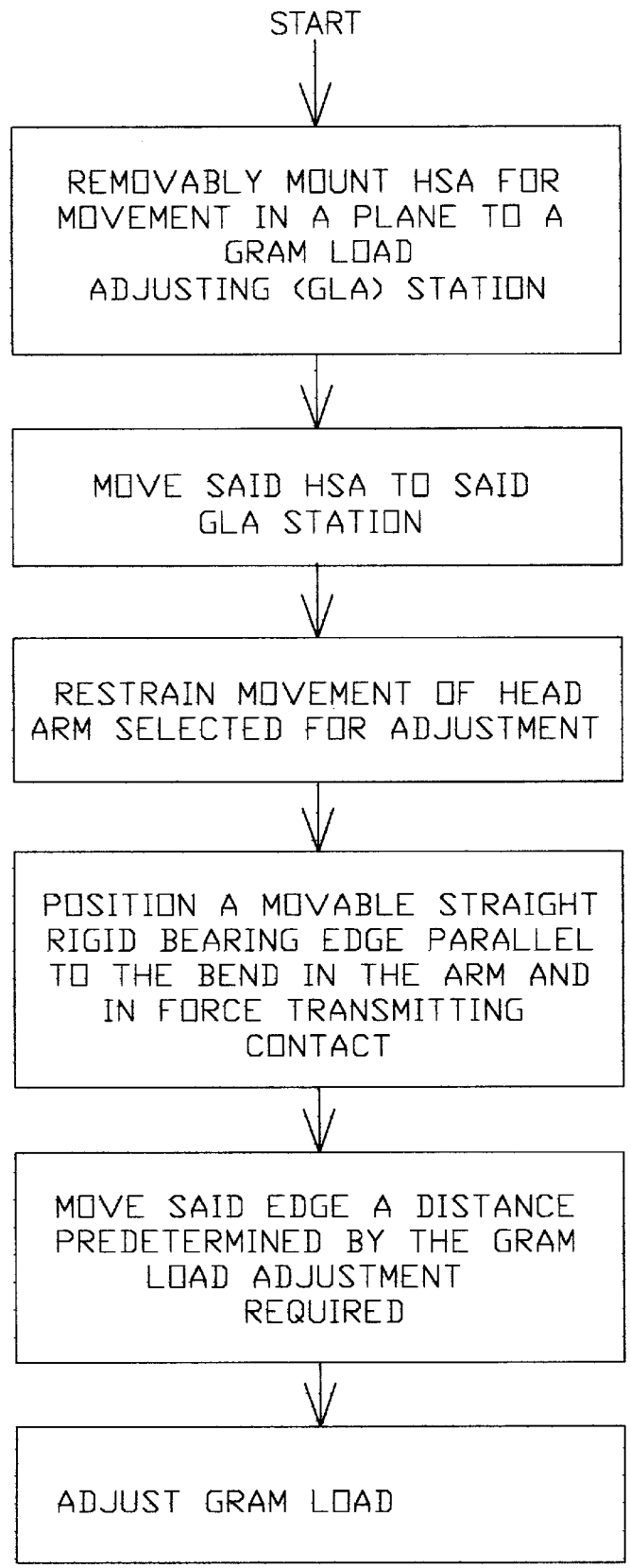
FIG. 7 is a flow chart of the steps involved in the method of this invention for adjusting the gram load of the head arm at the HSA level.

FIG. 7 is a flow chart which illustrates the basic steps of the method. The flow chart is self-explanatory when read in connection with the above detailed description of the HGA assembly. It should be understood that various modifications may be made within the scope of the invention. For example, the measuring station need not be as described since the present invention may be employed separately from the measuring station or in combination. Similarly, the path of the HSA movable platform need not be in a straight line. The path is dependent on the relative positions of the GLM station and the GLA station.

What is claimed is:

1. A method to adjust the gram load of a selected head gimbal assembly located in a head stack assembly having a plurality of head gimbal assemblies, each of which includes an elongated flexible member having a predetermined bend that is transverse to the longitudinal axis of said head gimbal assembly, said method comprising the steps of:

removably mounting said head stack assembly for movement in a plane parallel to said longitudinal axis of said selected head arm to a gram load adjusting station;

moving said head stack assembly to said gram loading station along a predetermined path for adjusting the gram load;

restraining movement of said selected head gimbal assembly during a gram load adjustment;

positioning a movable straight rigid bearing edge parallel to said bend in force-transmitting contact with the bend area of said flexible element; and moving said edge a predetermined distance for adjusting the initial gram load of said head gimbal assembly provided by the bend in said flexible element to a different predetermined value.

2. The method set forth in claim 1 further including the step of measuring the initial gram load of each of said head gimbal assemblies in said head stack assembly, and indicating to an operator if a head gimbal assembly has a gram load that needs to be adjusted at said gram load adjusting station.

3. The method set forth in claim 2 further including the step of converting the measured gram load of the head gimbal assembly selected for adjustment to said predetermined value employed by the gram load adjusting station.

4. The method set forth in claim 3 in which said step of removably mounting said head stack assembly includes providing a slidable platform having a head stack assembly mounting post and clamping means on said mounting post for clamping said head stack assembly with said head gimbal assemblies substantially parallel to the plane of movement of said platform and the longitudinal axis parallel to said path from said gram load measuring station and said gram load adjusting station.

5. The method set forth in claim 4 in which said step of restraining movement of said selected head gimbal assembly during a gram load adjustment includes the step of bracketing the selected head gimbal assembly with a plurality of elongated elements cantilevered from a support block which is movable into a position to support said selected head gimbal assembly prior to said adjusting step.

6. The method set forth in claim 5 in which said step of positioning said edge includes the step of mounting said edge in a cantilevered arrangement on one tower on one side of said head stack assembly that is movable parallel to said plane towards a second stationary tower located on the opposite side of said head stack assembly and which is adapted to provide support for said edge when said towers are moved vertically to adjust said gram load.

7. The method set forth in claim 5 in which said step of moving said edge includes the step of displaying to said operator a continuous indication of the vertical distance that said edge has moved.

8. The method set forth in claim 7 in which said step of positioning includes positioning a second movable straight rigid bearing edge spaced opposite said first edge a distance to allow said edges to bracket said flexible member of said head gimbal assembly and to be moved conjointly, and said step of moving said edge comprises moving said edges conjointly in a direction determined by whether the initial gram load adjustment of said selected head gimbal assembly needs to be increased or decreased.

9. A method to adjust the gram load of at least one head gimbal assembly located in a head stack assembly having a plurality of head gimbal assemblies, each of which includes an elongated flexible member having a predetermined bend that is transverse to the longitudinal axis of said member, said flexible member being joined to a rigid element; said method comprising the steps of:

removably mounting said head stack assembly on a post disposed normal to a first platform, that is movable in a plane normal to said post between a first home position and a second position, where the initial gram load of at least one of said head gimbal assemblies is to be adjusted to within a range of predetermined gram load values;

moving said first platform to said second position to permit each of the respective head gimbal assemblies to be maintained in a relatively fixed position by a plurality of elongated support members that are cantilevered out from a second platform, when the gram load of a selected one of said head gimbal assemblies is being adjusted, said second platform being movable in a direction toward said head stack assembly to cause said support members to engage the top and bottom surfaces of each head gimbal assembly;

positioning an elongated straight edge of a force-transmitting element transversely across the lengthwise axis of the selected head gimbal assembly at the point where said flexible element is joined to said rigid element, with said straight edge in contact with a flat surface of said flexible element; and moving said force-transmitting element for a predetermined distance in a direction to bend said flexible element for adjusting the initial gram load to be within said range.

* * * * *